United States Patent [19]

Marsh

[11] Patent Number: 4,457,181
[45] Date of Patent: Jul. 3, 1984

[54] NARROW PROFILE VORTEX SHEDDING BODY

[75] Inventor: David W. Marsh, Pawtucket, R.I.

[73] Assignee: The Foxboro Company, Foxboro, Mass.

[21] Appl. No.: 365,679

[22] Filed: Apr. 5, 1982

[51] Int. Cl.$^3$ .................................................. G01F 1/32
[52] U.S. Cl. .................................................. 73/861.22
[58] Field of Search ........... 73/861.21, 861.22, 861.23, 73/861.24

[56] References Cited

U.S. PATENT DOCUMENTS

| 4,085,614 | 4/1978 | Curran et al. | 73/861.24 |
| 4,197,739 | 4/1980 | Frick | 73/861.21 |
| 4,285,247 | 8/1981 | Klobe | 73/861.24 |

FOREIGN PATENT DOCUMENTS

| 48-20553 | 3/1973 | Japan | 73/861.22 |
| 1500704 | 2/1978 | United Kingdom | 73/861.22 |

Primary Examiner—Herbert Goldstein
Attorney, Agent, or Firm—Ronald J. Paglierani

[57] ABSTRACT

A body for improved shedding of vortices within a flowing fluid has a very short downstream length, e.g. ⅛ inch, yet is capable of excellent flow metering performance. The body includes an upstream elongate thin plate spanning the inner diameter of a conduit, and one or more sections projecting downstream of the plate. Generally, these sections are in the form of cylindrical rods having circular, rectangular, or oval cross-sections, with their longitudinal axes parallel to the longitudinal axis of the plate. Although these sections may be separated from the plate, in certain embodiments they are rigidly attached to the downstream side thereof. By simultaneously maintaining the ratio of the width (i.e., transverse to the flow direction) of the thin plate to the overall width of the downstream sections within the range from 1.0 to 2.2, and the ratio of the width of the thin plate to the diameter of the conduit within the range from 0.1 to 0.3, enhanced linearity of signal is achieved without the need for any appreciable downstream length. This results in a narrow profile flowmeter assembly which occupies the same amount of space as a conventional orifice plate. An ultrasonic detector and associated circuitry, or similar detecting scheme, sense the periodic passage of the vortices through the fluid and relate its periodicity to the rate of flow.

19 Claims, 16 Drawing Figures

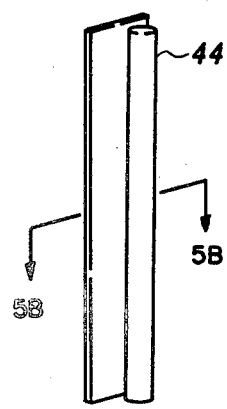
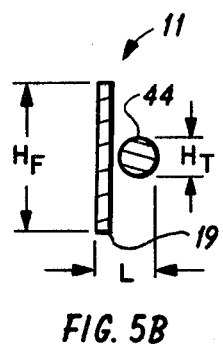
FIG. 5A
FIG. 5B
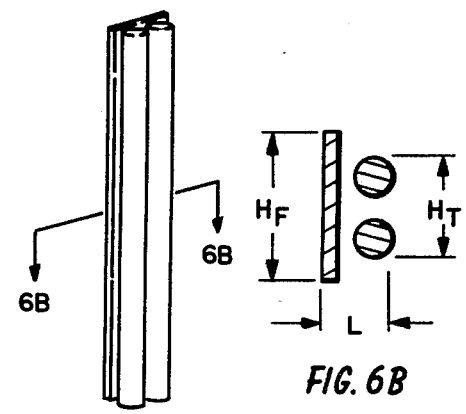
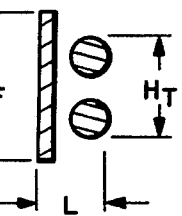
FIG. 6A
FIG. 6B
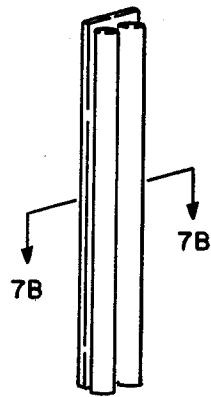
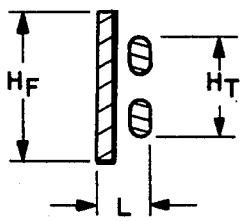
FIG. 7A
FIG. 7B
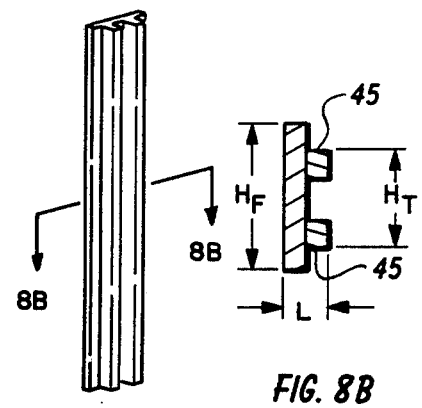
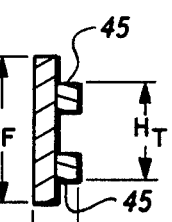
FIG. 8A
FIG. 8B
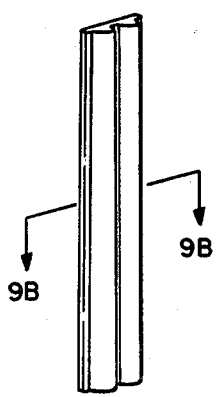
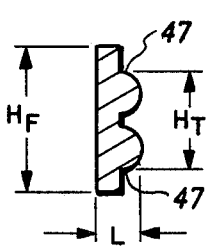
FIG. 9A
FIG. 9B
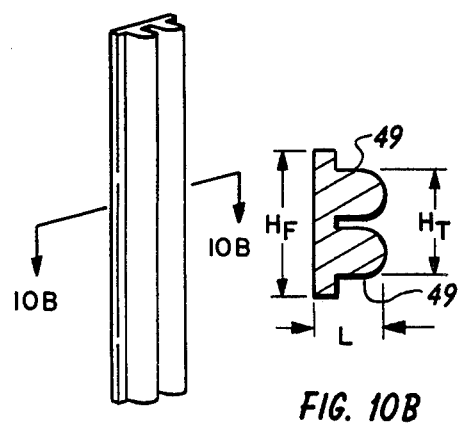
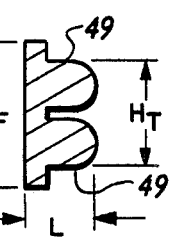
FIG. 10A
FIG. 10B

NARROW PROFILE VORTEX SHEDDING BODY

BACKGROUND OF THE INVENTION

The present invention relates generally to a vortex-shedding bluff body, and more particularly to such a body having a minimal downstream extension, usable in a narrow profile flowmeter configuration.

It is well known that the presence of a bluff, or non-streamlined, body within a moving fluid stream causes vortices to be shed alternately from opposite sides of the body, the frequency of production of the vortices being related to the flow rate of the fluid. The dynamics of the so-called Von Karman vortex street which emanates from the bluff body have been extensively studied, and the principles have been effectively applied in numerous commercial flow-rate measuring devices.

Although a single thin, flat plate is recognized as being capable of shedding vortices (see, for example U.S. Pat. No. 3,116,639), this shape has seen limited commerical use. Bluff bodies typically used in commerical flow meters have a more complex structure, and a downstream length which is a substantial fraction of the transverse width, generally resulting in a flowmeter of considerable length. For example, U.S. Pat. No. 3,572,117 shows a bluff body which extends downstream for a distance of one to two times its width. Similarly, in U.S. Pat. No. 3,948,097 the bluff body has a downstream length between 0.5 and 0.9 times its width, while U.S. Pat. No. 3,810,388 teaches that a width-to-length ratio of 1.5 (i.e., the length is ⅔ the width) yields maximum energy for vortex formation.

U.S. Pat. No. 4,297,898 discloses the use of "plate-like" upstream and downstream obstacles but the thickness of the respective obstacles and the gap therebetween yields a configuration whose overall downstream length is on the order of 1.2 times its width.

The use of a bluff body of appreciable downstream length has restricted the utility of a vortex flowmeter in certain applications. For example, a user of a narrow-profile flowmeter, such as an orifice plate, generally cannot replace his existing installation with the higher-performance vortex flowmeter without extensive modification to the piping system to accommodate the considerably longer vortex flowmeter housing. Although in U.S. Pat. Nos. 4,171,643 and 4,186,599 a narrow-profile vortex shedding configuration is formed from a thin plate, multiple vortex-shedding members are employed, spaced transversely across the diameter of the pipe.

In view of the above, it is an object of the present invention to generate strong, linear vortex streets from a bluff body without the need for a minimum downstream length. It is a further object of the invention to provide a narrow-profile vortex flowmeter using such a bluff body which is suitable for replacement of an orifice plate flow measuring system.

SUMMARY OF THE INVENTION

An embodiment of a body for shedding vortices within a fluid flowing through a conduit of inside diameter D, in accordance with the present invention, includes an upstream elongate member spanning the interior of the conduit, having an upstream-facing surface aligned normal to the flow direction. The surface has a width $H_F$ as measured perpendicular to the direction of span of the upstream member. The body further includes a downstream member, which also spans the interior of the conduit, its direction of span being parallel to that of the upstream member. This downstream member has a width $H_T$ in the direction normal to the flow direction, as measured perpendicular to its direction of span, and an extension L along the direction of flow, as measured from the upstream-facing surface. The ratio $H_F/H_T$ is within the range from 1.0 to 2.2, while the ratio $H_F/D$ is in the range from 0.1 to 0.3, and the ratio $L/H_F$ is less than 0.4.

In a particular embodiment of the present invention, the downstream member consists of elongate convex projections integrally formed with the back surface of the upstream member. These projections, in addition to being individually parallel to the direction of span of the upstream member, are also parallel to one another. There are one or more such projections. In the case of multiple projections, the dimension $H_T$ represents the overall width of the combination of projections, i.e., the transverse distance between the outermost edges of the two outermost projections. These projections can have various cross-sectional shapes, including rectangular, semi-circular and U-shaped.

In an alternate embodiment, the downstream portions are elongate plates or rods which are separated by a narrow gap from the back surface of the upstream plate. As in the previous embodiment, the rods or plates are parallel to each other as well as being parallel to the direction of span of the upstream member, and similarly they can have square, rectangular, circular, oval, etc. cross-sections. The overall width $H_T$ of such a configuration is the same as defined above for the convex projections.

The limitation of the overall downstream extension L of the bluff body structure to a maximum of 0.4 times the width $H_F$, allows the overall length of a flowmeter utilizing such a body to be no greater than the typical thicknesses of orifice plate installations, for an appreciable range of conduit inner diameters. This constraint makes the narrow profile flowmeter suitable for replacement of orifice plates.

BRIEF DESCRIPTION OF THE DRAWINGS

The novel features and advantages of the present invention will become apparent to those skilled in the art from the following description of the preferred embodiments in conjunction with the accompanying drawings in which:

FIG. 5A, 5B through 10A, 10B are, respectively, perspective and sectional views of several alternate embodiments of the bluff body, the sectional views being taken along the line 5B—5B through 10B—10B respectively.

DESCRIPTION OF THE ILLUSTRATED EMBODIMENTS

Figure 1:
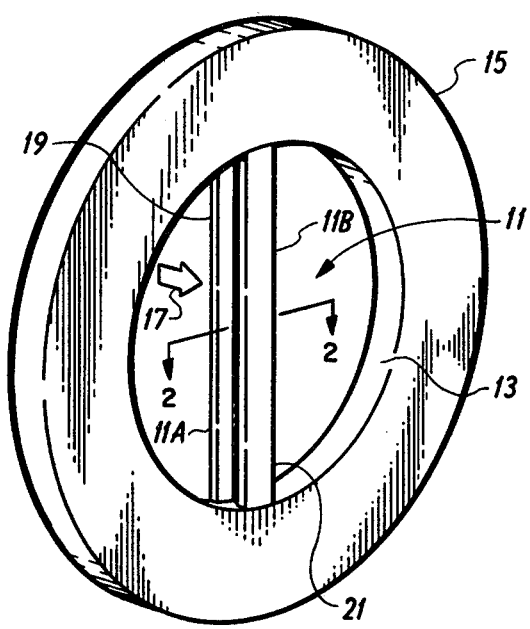
FIG. 1 is a perspective view of a bluff body in accordance with the present invention.

Referring now to FIG. 1, an elongate bluff body 11 spans a circular opening 13 within a thin housing 15. The body is rigidly attached to the housing at both ends. The opening is equal in size and shape to the bore of a conduit (not shown) within which the bluff body is placed for the purpose of shedding vortices within a stream of fluid. The direction of fluid flow, once the bluff body is placed within the conduit, is in the direction toward the viewer, as indicated by an arrow 17.

The bluff body 11 is made up of two components, an upstream portion 11A and a downstream portion 11B. The upstream portion is an elongate thin plate 19, with a flat upstream-facing surface 19A (see FIG. 2) aligned normally to the direction of fluid flow. The non-streamlined contours of the body cause vortices to be shed alternately from its opposite sides, in a manner well known to the art. The thickness, or downstream-extending dimension, of the plate is minimal, being determined primarily by the structural requirements necessary to withstand the forces generated by the fluid flowing past the plate. Preferably, the thinner the plate the better, since according to the present invention, desired stability and linearity characteristics of the vortex street can be maintained without the added downstream length taught by the prior art. Thus, extra downstream length means wasted volume and material.

The downstream portion 11B comprises a second elongate thin plate 21 parallel to the upstream plate 19 and stretching across the inner opening 13 of the housing in the same direction as the upstream plate. As with the first plate, the second plate is rigidly attached to the housing.

Figure 2:
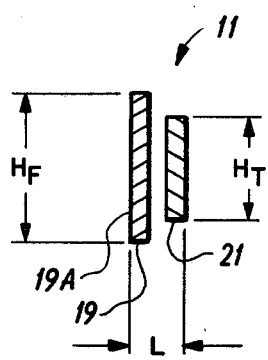
FIG. 2 is a cross-sectional view of the bluff body of FIG. 1, taken along the line 2—2.

Referring now to FIG. 2, there is shown a cross-sectional view of the bluff body 11 of FIG. 1 as viewed perpendicular to its longitudinal axis (longitudinal axis being the same as direction of span across the opening 13). This view shows quite clearly the parallel arrangement of the upstream and downstream portions. The width of the upstream plate 19, that is, the dimension which is normal both to the flow direction and to the longitudinal axis of the bluff body, is labeled as $H_F$. The width of the downstream plate 21 is similarly defined and is given the label $H_T$.

Experiments have shown that strong vortices having a frequency which is linearly proportional to the velocity of flow are achieved by maintaining the ratio $H_F/H_T$ within specified limits (hereinafter described), while simultaneously keeping the ratio of $H_F$ to the diameter D of the opening 13 within the range 0.1 to 0.3, a range of values already known to the prior art. (It should be remembered that the diameter D is equal to the diameter of the conduit through which the fluid flows.) This linearity is sustained over a range of velocities from approximately 0.5 to 10 feet per second (i.e., a 20:1 rangeability). These results are achievable even if the total downstream length L of the bluff body, as measured from the upstream-facing surface 19A, is allowed to fluctuate over a range of values, namely the range in which $L/H_F < 0.4$.

Figure 3:
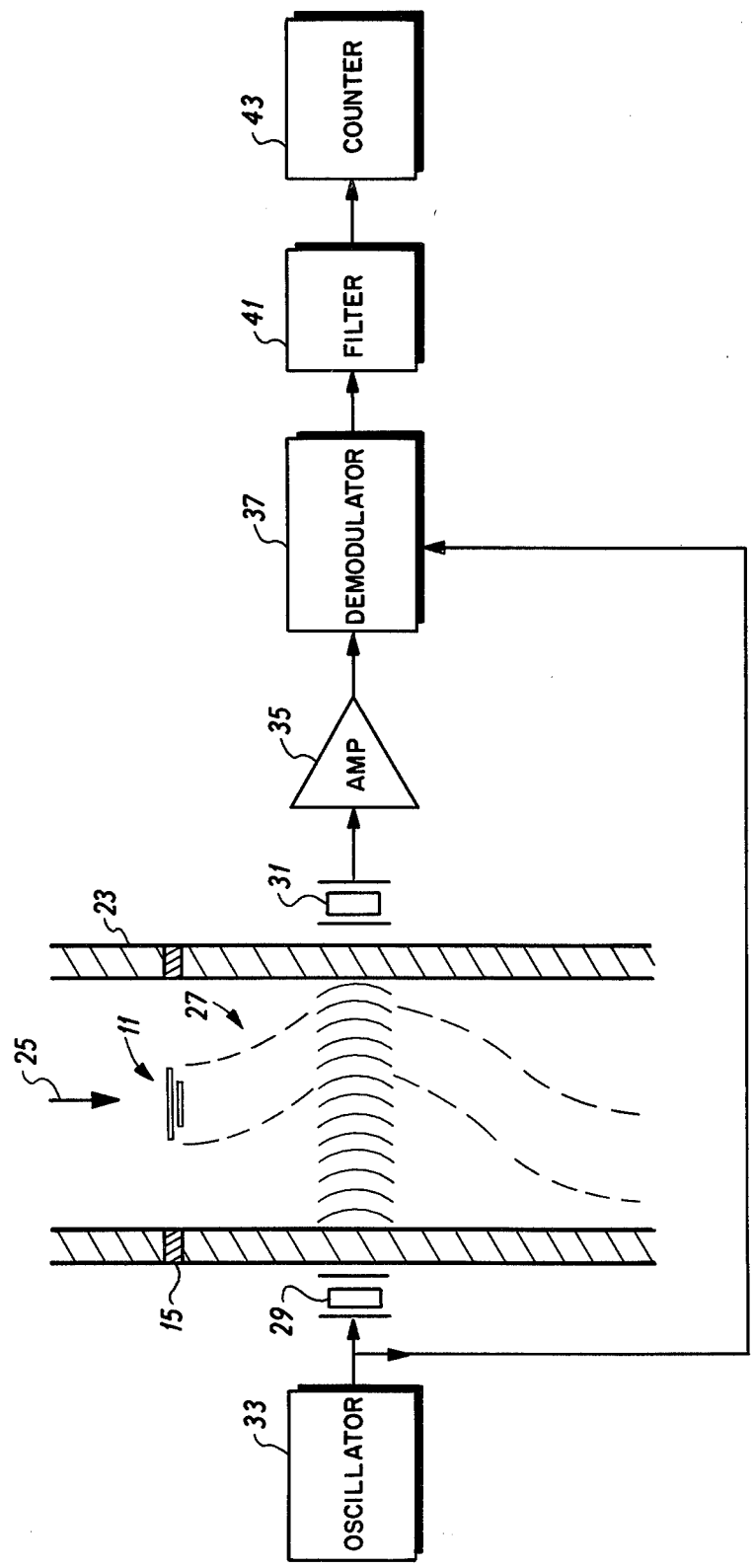
FIG. 3 is a schematic of a flowmeter apparatus utilizing the bluff body of FIG. 1.

FIG. 3 is a schematic representation of a flowmeter apparatus on which these experimental results were obtained. The bluff body 11 and its attached housing 15 are installed in a conduit 23 carrying fluid in the direction indicated by an arrow 25. The presence of the body within the stream generates a periodic vortex street, indicated generally by reference numeral 27, which progresses downstream with the moving fluid. At a downstream location, a pair of ultrasonic transducers, a transmitting transducer 29 and a receiving transducer 31, are disposed on opposite sides of the conduit. An oscillator 33, typically operating at a frequency of 1 MHZ, drives the transmitting transducer so as to project an acoustic signal through the conduit and the fluid, toward the receiving transducer. The interaction of the acoustic signal with the vortex-carrying fluid stream causes a modulation of the acoustic signal, at the repetitive frequency of the vortices. The receiving transducer detects the modulated signal and transfers it to an amplifier 35. The detected signal is passed through a demodulator 37 to yield a measurement signal having a frequency equal to that of the vortex street. Finally the measurement signal passes through a filter 41 to an electronic counter 43, producing an output indicative of the vortex generation frequency. Since acoustic or ultrasonic detection of vortices and vortex frequencies are well known in the prior art, no detailed description of the detection circuitry need be given. However it should be noted that any of a variety of well known vortex detection schemes, including non-acoustic systems, may be adaptable to the measurement of vortices produced by the bluff body of the present invention.

Visualizations of the flow around bluff bodies built in accordance with the present invention have shown that, due in part to the abbreviated downstream length, vortex formation occurs downstream of the entire body. The fully formed vortex is not shed from the upstream portion alone, but from the upstream and downstream portions acting in concert. Although the upstream and downstream portions, if viewed separately, each have vortex-shedding shapes, when coupled together as described herein they define a unitary vortex-shedding structure. Thus, it has been found that attempts to detect the vortices alongside, or at a point too near, the body may yield signals having unsatisfactory characteristics, e.g., poor stability and linearity. Optimum results are obtained by locating the ultrasonic transducers sufficiently downstream of the bluff body that the vortices have broken away from the separation streamline produced by the body, and have become fully defined. Typically, this is a distance of approximately two-thirds of the pipe diameter downstream from the body.

By externally setting the flow velocity of the stream to a predetermined, calibrated value and measuring the corresponding vortex frequency, a proportionality between the flow velocity and the frequency can be determined. Varying the flow velocity, while maintaining the dimensions of the bluff body constant, yields a series of proportionality values, and the percent deviation in the proportionality over a range of velocities equals the percent non-linearity of the vortex generating scheme. The generally accepted unit for expressing proportionality is the Strouhal number S, which is generally defined as the ratio of the vortex frequency F times the face width $H_F$ of the bluff body divided by the flow velocity V. Because of the unique geometry of the bluff body of the present invention, it is more appropriate to use the corrected Strouhal number $S_\infty$ as the indicator of proportionality, $S_\infty$ being given by the equation:

$$S_\infty = \frac{FH_F}{V} \left[ \frac{\frac{\pi D^2}{4} - H_F D}{\frac{\pi D^2}{4}} \right] \cdot \left[ 1 - \frac{H_F}{D} \right]^{1.35}$$

Figure 4:
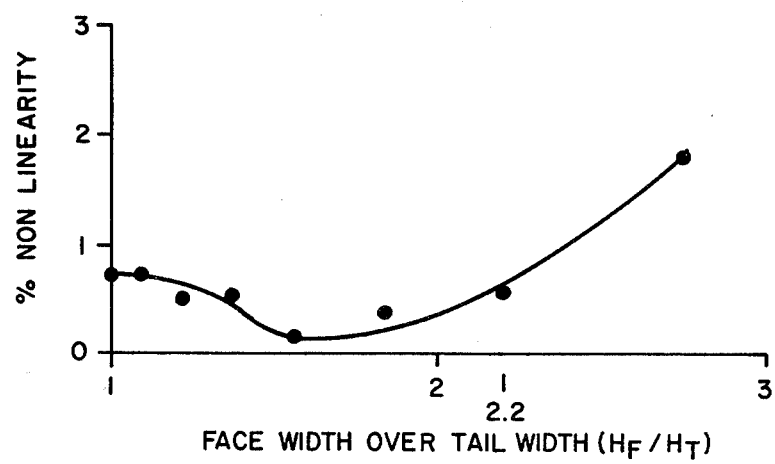
FIG. 4 is a graph depicting the variation in vortex linearity with variations in the ratio $H_F/H_T$.

The curve shown in FIG. 4 represents a general summary of the experimentally observed variations in linearity occurring with changes in $H_F/H_T$, for a variety of bluff body configurations built in accordance with the present invention. These data were generated with L constant, and $0.1 \leq H_F/D \leq 0.3$. It can readily be seen that a particularly desirable degree of linearity, i.e., non-linearity limited to within ±0.75%, can be expected when $H_F/H_T$ is in the range from approximately 1.0 to 2.2.

Although the downstream portion of the embodiment of FIG. 1 is a single, thin plate of rectangular cross-section, this is not the only type of downstream arrangement which performs adequately in the context of the present invention. For example, consider the bluff body shown in FIGS. 5A and 5B, in which the downstream portion is a rod, or cylinder, 44 of circular cross-section. Although experimentation was not performed on downstream bodies of every conceivable shape, it is generally expected that bodies have square, triangular or even irregularly shaped cross-sections will perform in accordance with the teachings of the present invention as long as the constraints on the ratio of $H_F/H_T$ and $H_F/D$ are observed.

It should be noted that isolated deviations from the desirable ±0.75% non-linearity shown in FIG. 4 may occur for a particular $H_F/H_T$ for a body configuration of the type shown in FIGS. 1 and 5A, i.e., a single downstream body separated from the upstream portion. Even in such a case, however, the body configuration continues to function as an effective vortex shedder. However, these deviations can be eliminated by altering slightly one of the dimensions, while keeping the ratios within the prescribed limits.

Multiple downstream bodies also are functional, as in the case of the structures shown in FIGS. 6A, 6B and 7A, 7B. It should be pointed out, however, that in the case of multiple downstream bodies, $H_T$ does not merely refer to the combined widths of the two individual bodies, but rather is a measurement of the overall width of the bodies, as measured between their outermost edges, as shown in FIGS. 6B and 7B.

Although in each of the previously discussed embodiments there is a separation between the back surface of the upstream portion and the downstream portions, the principles underlying the present invention are found not to be restricted to such a configuration. Indeed, as long as the dimensional ratios are maintained as previously discussed, the downstream portions can be attached to, or integrally formed with, the upstream portion, and the same vortex-generating characteristics are maintained. Referring now to FIGS. 8A and 8B, the downstream portions are in the form of discrete elongate protuberances or projections 45, having a convex outer surface, which depend from the back of the upstream portion. As in the case of the earlier embodiments, the longitudinal axes of these projections are parallel to the longitudinal axis of the upstream plate, as well as being parallel to each other. Although these projections are shown to be generally rectangular in cross-section, semi-circular projections 47 (FIGS. 9A and 9B), and U-shaped projections 49 (FIGS. 10A and 10B), also have proven acceptable. Again, although no more than two downstream portions are shown in any of the embodiments, it is to be understood that multiple such bodies can be used, subject to the dimensional limitations.

The present invention establishes that appreciable downstream length L (i.e., $L/H_F > 0.4$) of the bluff body is not necessary for producing commerically acceptable vortex streets, a notion which is contrary to that espoused by the prior art. Thus, the myriad bluff bodies described or suggested herein are particularly useful in a flowmeter having a narrow profile. In other words, the total length L can be made small enough to allow the bluff body and its surrounding housing 15 (see FIG. 1) to be no thicker than the spacing typically associated with orifice plates. For pipe sizes up to 8 inch diameter, a standard orifice plate generally is ⅛ inch thick; for larger pipe diameters, the orifice plates may range from ¼ to ½ inch thick. By inserting such a narrow profile flowmeter between two sections of pipe in the place of an orifice plate, and utilizing downstream ultrasonic transducers functioning in the manner of transducers 29, 31 (see FIG. 3), a traditional orifice plate installation can be converted to a more accurate, reliable and more linear vortex flowmeter installation with little if any modification to the piping system. In lieu of the electronic counter 43, appropriate electronic circuitry for converting the measurement frequency into a volumetric flow rate, or other appropriate units, can be substituted. Again such circuitry is well known to those skilled in the electronics art, and will not be elaborated upon in the present application.

Of all the embodiments described herein, the preferred embodiment is as shown in FIGS. 8A and 8B, with the attached rectangular projections. Experimentation has shown this embodiment to shed vortices effectively in both liquid and gaseous flows. When combined with a vortex detecting device, particularly an ultrasonic type, it provides an accurate and sensitive flowmetering capability. An embodiment which is particularly amenable to a vortex detecting scheme which depends on a physical interaction with the vortices, such as a piezoelectric detector, is the embodiment of FIGS. 5A and 5B. Sufficient energy is transferred between the vortices and the downstream circular rod to permit measurement of the vortex frequency through observation of the rod's movements. This bluff body configuration can be adapted readily to the external vortex sensing scheme disclosed in copending U.S. application Ser. No. 236,416, which has a common assignee as the present application.

Clearly, certain modifications and substitutions to the disclosed embodiments may become apparent to those skilled in the art, but which do not depart from the spirit of the present invention. For example, different cross-sectional shapes for the downstream portions of the bluff body, or alternate vortex detection schemes may be proposed. It is intended, however, that such modifications be included within the scope of the following claims.

What is claimed is:

1. A narrow-profile body for shedding vortices within a fluid flowing through a conduit of inside diameter D, comprising:
   an upstream elongate member spanning the interior of said conduit, having an upstream-facing surface aligned normal to the flow direction, said surface having a width $H_F$ as measured perpendicular to its direction of span; and
   a downstream elongate member, also spanning the interior of said conduit, its direction of span being parallel to the direction of span of said upstream member, having a width $H_T$, as measured perpendicular to its direction of span, and an extension L along the flow direction, as measured from said upstream-facing surface, the ratio $H_F/H_T$ being within the range from 1.0 to 2.2, the ratio $H_F/D$ being in the range from 0.1 to 0.3, and the ratio $L/H_F$ being less than 0.4.

2. The body as set forth in claim 1, wherein said downstream member is integral with said upstream member.

3. The body as set forth in claim 1, wherein said downstream member is separated from said upstream member.

4. The body as set forth in claim 2, wherein said downstream member comprises an elongate projection, aligned parallel to the direction of span of said upstream member and fixed to the downstream side of said upstream member.

5. The body as set forth in claim 2, wherein said downstream member comprises a plurality of elongate projections, each aligned parallel to the direction of span of said upstream member and fixed to the downstream side of said upstream member.

6. The body as set forth in claim 4, wherein said projection has a generally rectangular cross-section along its length.

7. The body as set forth in claim 4, wherein said projection has a generally semi-circular cross-section along its length.

8. The body as set forth in claim 4, wherein said projection has a U-shaped cross-section along its length.

9. The body as set forth in claim 5, wherein each of said projections has a generally rectangular cross-section along its length.

10. The body as set forth in claim 5, wherein each of said projections has a generally semi-circular cross section along its length.

11. The body as set forth in claim 5, wherein each of said projections has a U-shaped cross-section along its length.

12. The body as set forth in claim 3, wherein said downstream member comprises an elongate rod having a generally rectangular cross-section along its length.

13. The body as set forth in claim 3, wherein said downstream member comprises an elongate rod having a generally circular cross-section along its length.

14. The body as set forth in claim 3, wherein said downstream members comprises an elongate rod having a generally oval cross-section along its length.

15. The body as set forth in claim 3, wherein said downstream member comprises a plurality of elongate rods, each rod being aligned parallel both to the direction of span of said upstream member and to each other, and lying in a plane transverse to the flow direction.

16. The body as set forth in claim 15, wherein each of said rods has a generally rectangular cross-section along its length.

17. The body as set forth in claim 15, wherein each of said rods has a generally circular cross-section along its length.

18. The body as set forth in claim 15, wherein each of said rods has a generally oval cross-section along its length.

19. A narrow profile vortex-shedding assembly, suitable for insertion between two sections of conduit of inside diameter D, comprising:
a thin, annular housing having an inner opening which matches the bore of said sections of conduit;
a first elongate member spanning said inner opening and being rigidly attached to said housing, said first member having an upstream-facing surface aligned normal to the flow direction with a width $H_F$ as measured perpendicular to its direction of span, the ratio $H_F/D$ being in the range from 0.1 to 0.3; and
a second elongate member spanning said inner opening downstream of said first member, its direction of span being parallel to the direction of span of said first member, and being rigidly attached to said housing, said second member having an extension L along the flow direction as measured from said upstream-facing surface, the ratio $L/H_F$ being less than 0.4.

* * * * *